United States Patent Office 3,110,807
Patented Nov. 12, 1963

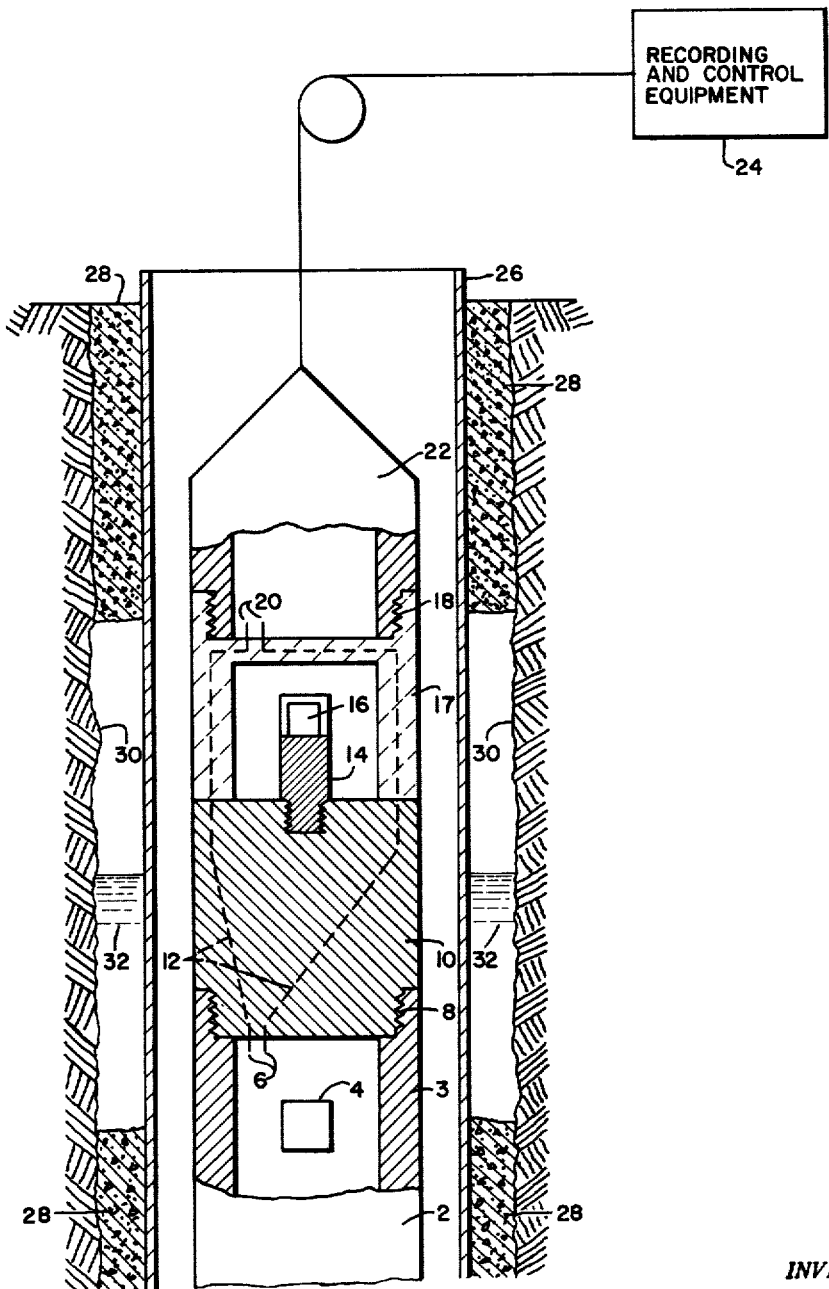

3,110,807
METHOD AND APPARATUS FOR LOCATING BOREHOLE CEMENT BY THE USE OF GAMMA RAYS
Billy F. Wilson, Tulsa, Okla., assignor to Well Surveys, Inc., a corporation of Delaware
Filed July 22, 1959, Ser. No. 828,858
2 Claims. (Cl. 250—83.3)

This invention relates to the logging of wells or boreholes to determine the nature and characteristics of the substances traversed by the borehole, and more particularly to a method and an apparatus for distinguishing cement from other substances surrounding casing in a cased borehole and determining the borehole depth at which the cement is located.

When wells are drilled into the earth for the purpose of recovering oil, gas, or any other valuable minerals, they necessarily penetrate all water or other fluid-bearing earth layers and formations which lie above the ultimate depth sought to be reached. This penetration or juncture consequently often creates an escape route by which these fluids may drain into other formations, or co-mingle with the oil and gas being taken from the well.

To prevent drainage of subsurface water, oil, or other valuable fluids not immediately sought to be recovered, it is the practice to insert cement between the casing and the wall of the borehole to seal the formations containing these fluids. However, considerations of cost often make it desirable that the cement be confined to those levels where the fluid-bearing strata are found.

The process of cementing a well involves forcing cement down through the casing, and then up between the casing and the borehole wall, until the cement reaches the desired borehole height. If the diameter of the borehole does not vary significantly throughout its depth, and if the cement being pumped into the casing is carefully measured, the cement is assumed to have sealed the selected stratum when a properly predetermined quantity of cement has been inserted between the casing and the borehole wall. However, if the borehole wall contains cavities of appreciable size, or if the quantity of cement is erroneously measured or calculated, then the cementing operation may be halted before the cement has reached the selected stratum because the error cannot unusually be detected from the earth's surface.

One method of ascertaining that the cement has been properly placed is to measure the temperature of the casing at the borehole levels sought to be cemented. This practice utilizes the well-known fact that cement, when "setting" or hardening, will generate a substantial amount of heat. This heat, in turn, will be partially transferred to the sections of casing adjacent the cement. Therefore, in a newly cemented well, the warmer sections of the casing are presumed to indicate the location of the cement.

As is also commonly known, however, this generation of heat is limited in its duration. Thus, the temperature of casing opposite completely hardened cement will not differ from the temperature of uncemented casing merely because of the cement. In addition, even for cement undergoing the hardening process the amount of heat being generated, and the duration of its generation, varies considerably with the type and proportion of the ingredients of the mixture. Moreover, hot springs of subsurface water, and other natural sources of subsurface heat, may give false indications of hardening cement.

Another method of locating cement in a borehole is to add radioactive material to the cement when inserting it in the well. Thereafter, a radiation detector is passed through the borehole, and the depth at which abnormal radioactivity is encountered is presumed to be the location of the cement. Such a method is difficult to use because the radioactive material itself requires special handling, and because the water rising to the top of the cement will retain some of the radioactive material and thus give a false indication of cement. Moreover, radioactivity well logging to detect variations in natural radioactivity emanating from the substances surrounding the borehole becomes difficult and unreliable after this method is used.

Still another method of ascertaining that the cement has been properly placed is to pass a radioactivity well logging device through the well to distinguish cement from other substances by virtue of the different radioactivity produced at various levels. All present radiological logging methods to locate cement in a borehole involve irradiating the borehole with neutrons or gamma rays, or both, and then attempting to distinguish between substances surrounding the borehole on the basis of differences in resulting radiation. Since many dissimilar substances produce similar resulting radiation, and since the radiation emitted by the logging devices is not confined to the substances between the casing and the borehole wall, it is difficult to distinguish between cement lying between the casing and the borehole wall, and substances such as sandstone or limestone traversed by the borehole.

These disadvantages of the prior art are overcome with the present invention, and novel methods and apparatus are provided which permit definite location of cement any time after it has been inserted, and without false sensings of similar cement-like substances traversed by the borehole. Moreover, the present invention is capable of use in conjunction with conventional well logging methods and apparatus with little or no modification of such conventional methods and apparatus.

The advantages of the present invention are preferably attained by irradiating the borehole with gamma rays of energy such that they penetrate the casing and the substances between it and the borehole wall, but do not penetrate the borehole wall and the earth formations traversed by the borehole, and using the apparatus hereafter described to accomplish this method of irradiation.

Accordingly, it is the object of the present invention to provide a novel method and apparatus for radioactivity well logging to precisely locate the top of cement which has been inserted around casing in a borehole.

It is also the object of the present invention to provide a novel method and apparatus for the identification and location of cement surrounding the casing in a cased borehole.

A specific object of the present invention is to provide a novel method of radioactivity well logging, said method comprising irradiating a cased borehole with gamma rays of such preselected energy that said rays penetrate and become scattered substantially only within a preselected range of penetration in the substances surrounding the casing in said borehole, detecting scattered gamma rays at a point spaced from the origin of irradiation a distance such that substantially a maximum number of gamma rays scattered in said preselected range are detected, establishing an electrical signal indicative of the number of gamma rays detected, and recording said signal correlative with an indication of the borehole depth at which said detections occur.

Another specific object of the present invention is to provide a novel apparatus for gamma ray well logging comprising a source of substantially monoenergetic radiation, a gamma ray detector, means housing said detector, means housing and positioning said source in axial alignment with said detector housing, means shielding said detector from direct irradiation by said source, said shielding means positioning said source in a predetermined functional relationship to said detector such that a maximum difference between preselected radiation effects will be detected.

These and other objects and features of the present invention will be apparent from the following detailed description wherein reference is made to the figure in the accompanying drawing.

In the drawing, the FIGURE is a view, partly in section, of a conventional radioactivity well logging device incorporating the present invention and suspended in a cased and cemented borehole.

In that form of the invention chosen for purposes of illustration in the drawings, the figure shows the logging device 2, recording and control equipment 24, cement 28 located at two levels between the casing 26 and the borehole wall 30, and water 32 trapped on top of the lower layer of cement 28.

Any conventionally designed radioactivity logging device 2 may be used with this invention provided it comprises a gamma ray detector 4 for natural gamma ray logging, and sufficient circuitry and other apparatus to convert gamma ray sensings to recordable signals to be passed to the recording and control equipment 24. Such a device 2 may have a casing collar locator 22 attached to one end, but this is not essential to the basic design and functioning of the invention except where, as illustrated in the figure, the invention takes the form of an adapter to permit simultaneous operation of the casing collar locator 22 and the invention. As an adapter, the invention is depicted as new and novel appartus interposed between the natural gamma ray detector 4 and the casing collar locator 22 at the point where the casing collar locator 22 is usually attached to the device housing 3. This new and novel apparatus comprises a gamma ray source 16 (either capsuled or uncapsuled) enclosed by a source housing 17. For optimum operation of the invention, the source housing 17 is composed of material which is substantially transparent to radiation from the source 16. The source 16 is mounted on a source holder 14 which is mounted on shielding material 10 interposed between the source 16 and the detector 4.

This shielding material 10 is composed of a substance substantially opaque or impervious to radiation, and functions to protect the detector 4 from direct irradiation by the source 16. It is therefore preferable, for optimum results in using this invention, that the shielding material 10 be located as close to the detector 4 as is conveniently possible. If the invention takes the form of an adapter, as is illustrated in the figure, then the shielding material 10 should be provided with connecting means 8 to permit attaching it to the device 2. The source housing 17 should then be similarly designed with connecting means 18 to permit attaching the casing collar locator 22 to the new and novel apparatus. To enable the casing collar locator 22 to function properly with the new and novel apparatus interposed between it and the detector 4, connectors 6 and 20 are preferably provided together with electrical leads 12 between them to connect the casing collar locator 22 circuitry to the logging device 2 circuitry. The paths of these electrical leads 12, through the shielding material 10, should be angular or indirect so that these paths do not permit direct irradiation of the detector 4 by the source 16, in spite of the interposition of the shielding material 10.

To use this invention to locate the cement 28, the logging device 2 and attached new and novel apparatus is moved lnogitudinally through the casing 26 while the source 16 irradiates the wall of the casing 26 with gamma rays. It is therefore essential that the rays be of substantially such energy that they will penetrate the source 16 capsule (if any), the source housing 17, any and all borehole fluids, the casing 26, and the substances located between the casing 26 and the borehole wall 30, but will not penetrate the formations lying laterally beyond the 'ace of the borehole wall 30. If this is properly accomplished these gamma rays will tend to be scattered primarily in the substances located between the casing 26 and the borehole wall 30. Since the number of scattered rays which return to the interior of the casing 26 will relate directly to the character of the substances which accomplished the scattering, it is preferable that the least possible number of rays penetrate the borehole wall 30, or fail altogether to penetrate the casing 26. Therefore, in order that the rays sensed by the detector 4 be primarily those rays scattered in the substances located immediately outside the casing 26, a material emitting substantially monoenergetic gamma rays of a particular energy should be used for the source 16.

With the scattering of the gamma rays thus confined primarily to a particular zone of investigation, the number of rays sensed by the detector 4 will indicate the character of the substnaces within the preselected zone of investigation. Moreover, with the logging device 2 and the new and novel apparatus designed and positioned as shown in the figure and as herein described, it has been experimentally determined that the detector 4 will sense a maximum ratio of the gamma rays scattered by the water 32 (before returning to the casing 26 interior) to the number of rays sensed when the rays are scattered by the cement 28, when the source 16 is spaced a particular distance from the detector 4. In other words, when the source 16 is spaced properly from the detector 4, the detector 4 will sense the greatest number of gamma rays scattered by the water 32 with respect to the number of rays it will sense when the rays are scattered by the cement 28 which has trapped the water 32. In the form of the invention chosen for illustration in the figure, the shielding material 10 and the source holder 14 cooperate to provide the particular source 16 to detector 4 spacing necessary to achieve this maximum ratio of detected gamma rays. However, since the primary function of the shielding material 10 is protection of the detector 4 from direct irradiation by the source 16, and since this shielding function is independent of the spacing function, proper spacing can be attained by many obvious and convenient methods without departing from the scope of this invention. In addition, these methods may include the use of either fixed or adjustable means or apparatus.

As previously stated, in the form of the invention shown in the figure, the source holder 14 cooperates with the shielding material 10 to provide the particular source 16 to detector 4 spacing desirable for accurate functioning of this invention. However, if the source holder 14 position the source 16 in axial alignment with the detector housing 3, irradiation from the source 16 will be equal in intensity and quantity in all directions from the source 16 and source housing 17, and therefore the necessity for urging the logging device 2 and the new and novel apparatus against the casing 26 will be eliminated. This feature will permit the logging device 2 and new and novel apparatus to be more easily moved longitudinally through the casing 26. In addition, and more significant to this invention, when a source 16 is thus positioned, and when this source 16 emits substantially monoenergetic gamma rays of the proper energy, it will be immaterial to the functioning of this invention where the device 2 and new and novel apparatus has been laterally positioned in the casing 26, and it will be immaterial to this invention how the borehole avries in shape or size throughout its depth. It has been found preferable for optimum results, however, if the source holder 14 is made to be a component separate and distinct from the shielding material 10 (which it need not be), that it be composed of material substantially transparent to radiation.

A substance, which has been found satisfactory for use for the source 16, is the isotope cesium$^{137}$ which provides a substantially moncenergetic emission of gamma rays of approximately 0.66 mev. energy. Any quantity of this material sufficient to overcome the effect of natural radioactivity will be satisfactory since the energy of the emitted gamma rays, rather than number of rays emitted, is the significant feature of this invention. When the isotope cesium[137] was used for the source 16, and when the source 16 was moved to various lateral positions in the casing 26, it was experimentally determined that gamma ray penetration and scattering was substantially limited to a lateral depth of approximately ½ inch immediately outside the wall of standard casing 26 of approximately 5½ inches outside diameter. It was also determined that when the cesium[137] source 16 was spaced approximately 22¼ inches from the near side of the detector 4, a maximum ratio of approximately 2.2 times as many scattered gamma rays were detected, when water 32 was irradiated by the source 16, compared to the number of scattered gamma rays detected when cement 28 was irradiated. Although this ratio of detected gamma rays decreased when the source 16 was moved either away from or nearer to the detector 4, a ratio large enough to indicate the top of the cement 28 was maintained throughout a spacing range of 10 inches to 30 inches. During the various tests all spacings were measured between the center of the source 16 and the near side of a 2 inch x 1¾ inch sodium iodide crystal which was mounted on a photomultiplier tube. However, any apparatus capable of functioning as a natural gamma ray detector 4 will be satisfactory for this invention. Of course, the ratio of detected scattered gamma rays decreases proportionately as the percentage of solid matter mixed with the water 32 increases; i.e., when mud is found at the cement 28 top, rather than water 32, the detection ratio will be substantially less. However, the spacing required to achieve the maximum detection ratio will not change where mud is irradiated rather than water 32. When fluids other than water 32 are trapped by the cement 28, the same source 16 to detector 4 spacing will provide an accurate indication of the top of the cement 28 with the use of this invention.

When a scintillation counter and discriminator is used for a detector 4, instead of some other type of sensing apparatus such as a Geiger-Meuller counter, it is desirable to adjust the discriminator to pass all signals indicative of sensed gamma rays with energies greater than 50 kev. This is due primarily to the noise level usually encountered at lower discriminator adjustments or "settings." In addition, when the discriminator is set to pass only signals indicative of sensed gamma rays having energies greater than 250 kev., the counting rate is usually so low and statistical variations therefor so high that the ratio of water 32 to cement 28 counting rates becomes difficult to observe. However, the discriminator setting is not an essential element of the present invention, since the optimum source 16 to detector 4 spacing is not affected by the discriminator setting selected.

Other substantially monoenergetic substances can be used for the source 16, although it has been determined that monoenergetic radiations of energies more than 0.5 mev., but not more than 1.0 mev., will confine the zone of investigation to that immediately outside any standard size casing 26. Moreover, this range of source 16 energies will limit the optimum source 16 to detector 4 spacing to not less than 10 inches nor more than 30 inches, which is generally the most convenient spacing for the purpose of this invention.

As was stated earlier, any type of radio activity well logging device 2 can be used with this invention provided that it incorporates a means capable of detecting gamma rays.

In addition, although the figure shows the new and novel apparatus in the form of an adapter and, as such, usable only in conjunction with conventional logging devices, if the new and novel apparatus comprises a source 16, source housing 17, source holder 14, shielding material 10, a gamma ray sensing means, and the usual logging instrument circuitry necessary to convert the sensings into recordable signals, this invention can then be used independently of any other well logging equipment and methods.

Moreover, the new and novel apparatus can also be completely integrated into the design of a logging instrument which incorporates this invention as a permanent part of its operation and circuitry. In such a form, the optimum spacings can be more precisely attained.

Numerous other variations and modifications may obviously be made without departing from the invention. Accordingly, it should be clearly understood that those forms of the invention described above, and shown in the figure of the accompanying drawing, are illustrative only and are not intended to limit the scope of the invention.

What I claim is:

1. In apparatus for distinguishing between cement and water in the annulus between the casing and the borehole wall of a cased borehole which includes a well tool and surface apparatus, a well tool adapted to pass through a borehole, said tool comprising a source of substantially monoenergetic gamma rays of energy sufficient to penetrate the casing of the borehole but insufficient to penetrate to the borehole wall without substantial interactions with material present in the annulus between the casing and the borehole wall, material substantially transparent to gamm rays of such energy disposed about said source to provide paths for gamma rays to pass outwardly to the borehole from said source without substantial collimation, a gamma ray detector, shielding means disposed between said source and said detector shielding said detector from direct radiation from said source, and means positioning said detector relative to said source at an axial distance providing substantially the greatest ratio of the number of gamma rays incident upon said detector with water in said annulus to the number of gamma rays incident upon said detector with cement in said annulus.

2. A method of distinguishing between cement and water in the annulus between the casing and the borehole wall of a cased borehole which comprises radiating gamma rays outwardly in all directions from a first place inside a cased borehole, said gamma rays being substantially monoenergetic and of energy sufficient to penetrate to the borehole wall without substantial interactions with material present in the annulus between the casing and the borehole wall, detecting gamma rays at a second place inside said borehole displaced axially of said borehole from said first place by an axial distance providing substantially the greatest ratio of the number of gamma rays incident upon said detector with water in said annulus to the number of gamma rays incident upon said detector with cement in said annulus, and shielding said second place from direct radiation by gamma rays from said first place.

References Cited in the file of this patent

UNITED STATES PATENTS

| | | |
|---|---|---|
| 2,469,461 | Russell | May 10, 1949 |
| 2,769,096 | Frey | Oct. 30, 1956 |
| 2,934,652 | Caldwell et al. | Apr. 26, 1960 |
| 2,942,111 | Worthington | June 21, 1960 |

UNITED STATES PATENT OFFICE
CERTIFICATE OF CORRECTION

Patent No. 3,110,807                 November 12, 1963

Billy F. Wilson

It is hereby certified that error appears in the above numbered patent requiring correction and that the said Letters Patent should read as corrected below.

Column 1, line 21, for "juncture" read -- puncture --; line 45, for "unusually" read -- usually --; column 3, line 66, for "lnogitudinally" read -- longitudinally --; column 4, line 16, for "substnaces" read -- substances --; line 63, for "avries" read -- varies --.

Signed and sealed this 21st day of April 1964.

(SEAL)
Attest:

ERNEST W. SWIDER

Attesting Officer

EDWARD J. BRENNER

Commissioner of Patents